United States Patent
Preston et al.

(10) Patent No.: US 8,781,945 B2
(45) Date of Patent: Jul. 15, 2014

(54) MARKET DATA ALERT AND NEWS-DRIVEN ALERT SYSTEM

(75) Inventors: Marc Preston, Woodmere, NY (US); Lawrence Frisch, Fort Lauderdale, FL (US)

(73) Assignee: News Patent LLC, Woodmere, NY (US)

( * ) Notice: Subject to any disclaimer, the term of this patent is extended or adjusted under 35 U.S.C. 154(b) by 1231 days.

(21) Appl. No.: 12/019,863

(22) Filed: Jan. 25, 2008

(65) Prior Publication Data

US 2009/0189760 A1    Jul. 30, 2009

(51) Int. Cl.
G06Q 40/00    (2012.01)
G06Q 40/04    (2012.01)
G06Q 40/06    (2012.01)

(52) U.S. Cl.
CPC .............. G06Q 40/00 (2013.01); *G06Q 40/04* (2013.01); *G06Q 40/06* (2013.01)
USPC .............................. 705/37; 705/36 R; 705/38

(58) Field of Classification Search
CPC ........ G06Q 40/00; G06Q 40/06; G06Q 40/04
USPC ............................................ 705/37, 36 R, 38
See application file for complete search history.

(56) References Cited

U.S. PATENT DOCUMENTS

| | | | |
|---|---|---|---|
| 8,027,893 B1 | 9/2011 | Burrows et al. | 705/35 |
| 2004/0153453 A1 | 8/2004 | Brodie et al. | 707/10 |
| 2006/0173761 A1 | 8/2006 | Costakis | 705/35 |
| 2007/0136165 A1 | 6/2007 | Cha | 705/35 |

OTHER PUBLICATIONS

PR Newswire, "Nextrend Technologies Launches LiveScan Version 2.0 and Market Scan Plus for Active Traders," PR Newswire, New York: Sep. 25, 2003.*
Trade Ideas On-line, <http://www.trade-ideas.com/SingleAlertType>.
Trade Ideas On-line, <http://www.trade-ideas.com/StockInfo/_TopListConfig.html>.
LiveScan(SM), <http://www.nextrent.com/LiveScan_s/41.htm>.
Market Scan, <http://www.nextrend.com/Stock_Market_Scanning_s/22.htm>.
Real Time News Wires, <http://www.nextrend.com/Stock_Charts_News_Scanner_s/11.htm>.
DecisionBar for eSignal, <http://www.decisionbar.com/html/esignal.html>.
MultiCharts with DecisionBar, <http://www.decisionbar.com/html/multicharts.html>.
International Search Report dated Mar. 10, 2009.

(Continued)

*Primary Examiner* — Daniel Felten
(74) *Attorney, Agent, or Firm* — Ostrolenk Faber LLP

(57) ABSTRACT

A system for providing a real-time user notice or alert for traders and daytraders based on stockmarket events or other market data is disclosed. The system provides for receiving a user selection of a first market event setting, and receiving user input specifying a maximum period of time, and providing the alert only if within the maximum period of time specified a first market signal corresponding to the first market event occurs and a second market signal corresponding to the first market event occurs, the first and second market event both corresponding to the same market event selection but being at different values. Also, customizable business or market news-based alerting is disclosed to allow signals and/or filters to be set for news-driven alerts.

137 Claims, 8 Drawing Sheets

(56) References Cited

OTHER PUBLICATIONS

Trade Ideas On-line, <http://web.archive.org/web/20070101171747/http://www.trade-ideas.com/singlealerttype> dated Jan. 1, 2007.
Trade Ideas On-line, <http://web.archive.org/web/20070421130339/http://www.trade-ideas.com/StockInfo/_TopListConfig.html> dated Apr. 21, 2007.

DecisionBar for eSignal, <http://web.archive.org/web/20061025131600/http://www.decisionbar.com/html/esginal.html> dated Oct. 25, 2006.
MultiCharts with DecisionBar, <http://web.archive.org/web/20061208012337/http://www.decisionbar.com/html/multicharts.html.> dated Dec. 8, 2006.

* cited by examiner

Signals   Filters   Exchanges & Lists   Scan Name

| | | | 13 |
|---|---|---|---|
| 12 ☑ | New High | 0 | Minimum Day |
| 14 ☑ | New Low | 0 | Minimum Day |
| ☐ | At The High | | |
| ☐ | At The Low | | 15 |
| ☐ | Cross Above 5 Minute Moving Average | 7 ▼ | |
| ☐ | Cross Below 5 Minute Moving Average | 7 ▼ | |
| ☐ | Cross Above 15 Minute Moving Average | 7 ▼ | |
| ☐ | Cross Below 15 Minute Moving Average | 7 ▼ | |
| ☐ | Cross Above 60 Minute Moving Average | 7 ▼ | |
| ☐ | Cross Below 60 Minute Moving Average | 7 ▼ | |
| ☐ | New 52 Week High | | |
| ☐ | New 52 Week Low | | |

16 {
- ☑ New Pre Market High
- ☑ New Pre Market Low
- ☑ New Post Market High
- ☑ New Post Market Low
- ☑ At Pre/Post Market High
- ☑ At Pre/Post Market Low ☐ New 1 Minute Pre/Post High
☐ New 1 Minute Pre/Post Low
☐ New 3 Minute Pre/Post High
☐ New 3 Minute Pre/Post Low
☐ Consolidate
☐ New 10 Minute High

Fig. 2

Signals    Filters    Exchanges & Lists    Scan Name

| | | | |
|---|---|---|---|
| 22 — ☐ | Min Count: | | |
| ■ | Max Count: | | |
| ☐ | Min Seconds: — 26 | | |
| 24 — ■ | Max Seconds: | 10 | |
| ☐ | Min Price: | | Dollar |
| ■ | Max Price: | | Dollar |
| ☐ | Min Spread: | | Dollar |
| ■ | Max Spread: | | Dollar |
| ☐ | Min Float: | | Shares |
| ■ | Max Float: | | Shares |
| ☐ | Min Shares Outstanding: | | Shares |
| ■ | Max Shares Outstanding: | | Shares |
| ☐ | Min % Of Float Short: | | % |
| ■ | Max % Of Float Short: | | % |
| ☐ | Min Bid Size: | | Shares |
| ■ | Max Bid Size: | | Shares |
| ☐ | Min Ask Size: | | Shares |
| ■ | Max Ask Size: | | Shares |
| ☐ | Min Current Volume: | | Shares |
| ■ | Max Current Volume: | | Shares |
| 28 — ☐ | Min Average Daily Volume: | 200000 | Shares |
| ■ | Max Average Daily Volume: | | Shares |
| ☐ | Min Real Time Volume Multiple: | | 1, 2, 3 |

Fig. 4

| Icon | Trade Time | Symbol | Count | ADV | Range | Description | Value | Real Time Value | Second |
|---|---|---|---|---|---|---|---|---|---|
| | 12:19:57 | CBB | 17 | 0 | 0.8 | Cross Above 50 Day MA | 0.00 | 0.55 | 0 |
| | 12:19:57 | MRO | 55 | 0 | 0.29 | Significant Move Up: $00.35 within last one Minute | 0.35 | 1.07 | 0 |
| | 12:19:56 | LVS | 120 | 0 | 0.24 | Significant Move Up: $00.96 within last one Minute | 0.96 | 1.18 | 0 |
| | 12:19:55 | PPDI | 26 | 0 | 0 | New 7 Day Low(0 days back) | 7.00 | 0.8 | 177 |
| | 12:19:55 | ELOY | 11 | 0 | 0 | New 24 Day Low(0 days back) | 24.00 | 0.84 | 0 |
| | 12:19:55 | ELOY | 12 | 0 | 0 | New 24 Day Low(0 days back) | 24.00 | 0.66 | 0 |
| | 12:19:55 | ELOY | 10 | 0 | 0 | New 24 Day Low(0 days back) | 24.00 | 0.82 | 0 |
| | 12:19:55 | ELOY | 9 | 0 | 0 | New 15 Day Low(0 days back) | 15.00 | 0.81 | 0 |
| | 12:19:55 | ELOY | 8 | 0 | 0 | New 15 Day Low(0 days back) | 15.00 | 0.8 | 6459 |
| | 12:19:54 | NJR | 4 | 0 | 0.98 | Cross Above 50 Day MA | 0.00 | 0.79 | 0 |
| | 12:19:53 | NFJ | 6 | 0 | 0.67 | Cross Above 50 Day MA | 0.00 | 0.9 | 0 |
| | 12:19:53 | RQI | 4 | 0 | 0 | New Low(0 days back) | 0.00 | 0.6 | 0 |
| | 12:19:53 | RQI | 3 | 0 | 0 | New Low(0 days back) | 0.00 | 0.6 | 0 |
| | 12:19:53 | RQI | 2 | 0 | 0 | New Low(0 days back) | 0.00 | 0.59 | 0 |
| | 12:19:53 | STLD | 24 | 0 | 1 | New High(10 days back) | 0.00 | 0.72 | 10 |
| | 12:19:52 | SIMC | 3 | 0 | 1 | New High(2333 days back) | 0.00 | 0.4 | 2333 |
| | 12:19:51 | FBC | 1 | 0 | 0.41 | Significant Move Up: $00.22 within last one Minute | 0.22 | 2.65 | 2 |
| | 12:19:50 | LVS | 119 | 0 | 0.24 | Significant Move Up: $00.92 within last one Minute | 0.92 | 1.18 | 2 |
| | 12:19:48 | LVS | 118 | 0 | 0.23 | Significant Move Up: $00.88 within last one Minute | 0.88 | 1.18 | 1 |
| | 12:19:48 | VRSN | 27 | 0 | 1 | New 1 Day High(4162 days back) | 1.00 | 0.6 | 4162 |
| | 12:19:48 | MEOH | 23 | 0 | 1 | New High(197 days back) | 0.00 | 1.01 | 197 |
| | 12:19:48 | DTG | 3 | 0 | 0.77 | Significant Move Up: $00.18 within last one Minute | 0.18 | 1.26 | 3 |
| | 12:19:48 | KNDL | 20 | 0 | 1 | New High(6053 days back) | 0.00 | 0.47 | 6053 |
| | 12:19:47 | LVS | 117 | 0 | 0.23 | Significant Move Up: $00.87 within last one Minute | 0.87 | 1.18 | 0 |
| | 12:19:47 | MFD | 2 | 0 | 0.72 | Significant Move Down: $00.21 within last one Min... | 0.21 | 1.01 | 4 |
| | 12:19:47 | LVS | 116 | 0 | 0.22 | Significant Move Up: $00.81 within last one Minute | 0.81 | 1.18 | 1 |
| | 12:19:45 | FBP | 8 | 0 | 0.29 | Cross Above 50 Day MA | 0.00 | 0.76 | 0 |
| | 12:19:44 | SRT | 7 | 0 | 1 | New High(30 days back) | 0.00 | 1.63 | 30 |
| | 12:19:44 | VNQ | 97 | 0 | 0 | New 4 Day Low(0 days back) | 4.00 | 0.85 | 154 |

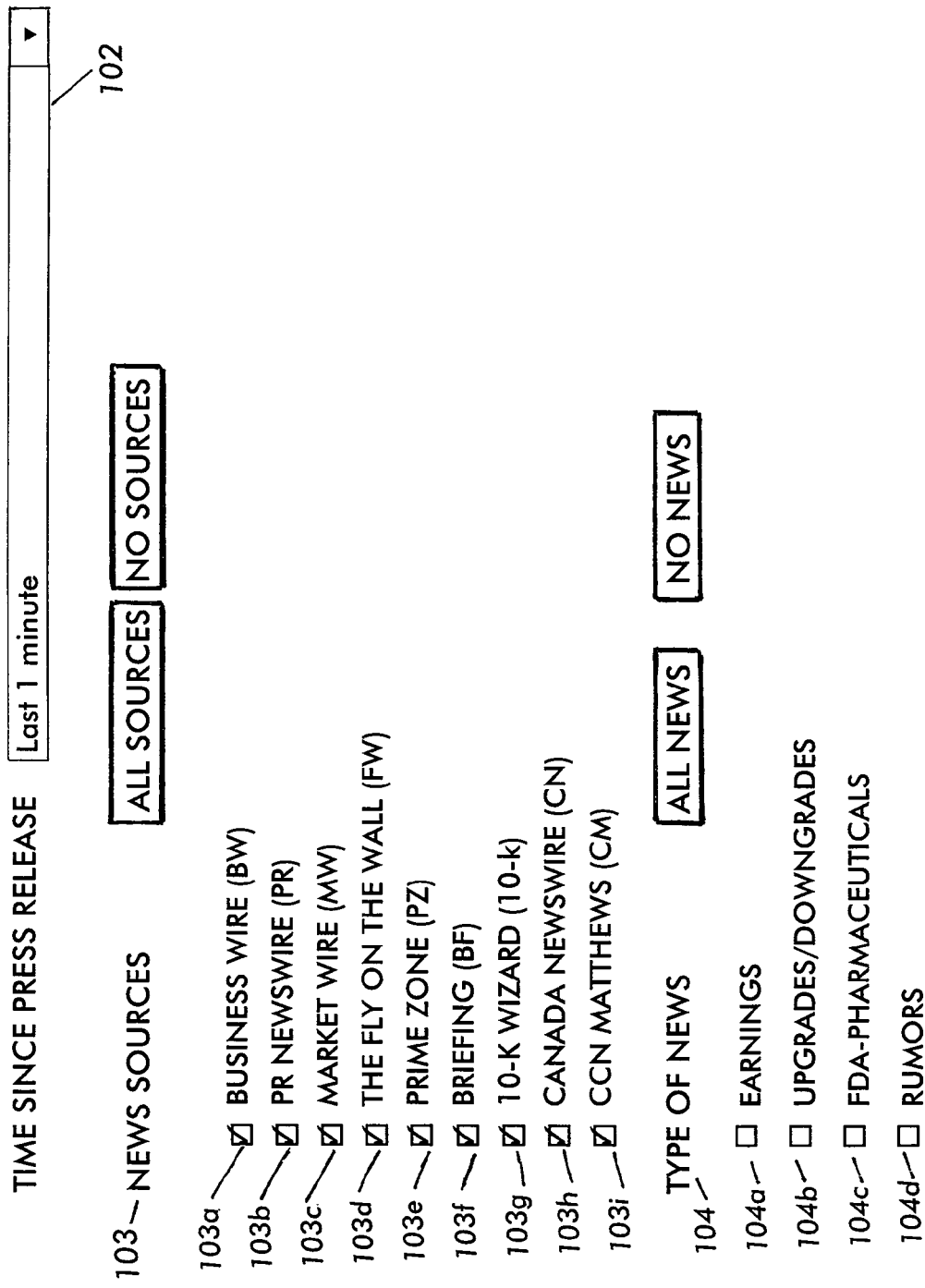

Fig. 7

AND ONLY USE SYMBOLS FROM THE LISTS BELOW:

110 — ☐  Select Symbol List  [PERSONAL ▼] — 111

112 — Earnings List

Days Back: [1 ▼] — 113a    Days Forward: [1 ▼] — 113b

Yesterday:    Today: — 115    Tomorrow: — 116

112a — ☐ Pre Market   ☐ Pre Market   ☐ Pre Market
  112b — ☐ During      ☐ During      ☐ During
      ☐ Post Market   ☐ Post Market   ☐ Post Market
              114

121 — ☑ Recent Ipos (3 Months)

122 — ☐ Mad Money Mentions: Days Back [1 ▼] (1 = Last Night) — 125

123 — ☐ Upgrades/Downgrades:
    ☐ Coverage Dropped
    ☐ Coverage Initiated
    ☐ Coverage Reit/Price Target Ch
    ☐ Downgrades
    ☐ Upgrades ☐ Check All — 124

Brokerage Firm:
    ☐ Am Tech Research
    ☐ Avondale Partners
    ☐ Banc of America Sec
    ☐ Bear Stearns
    ☐ Bernstein
    ☐ BMO Capital Markets
    ☐ Brean Murray
    ☐ Broadpoint Capital
    ☐ Calyon Securities
    ☐ Cantor Fitzgerald
    ☐ Credit Suisse — 88

☐ Check All

Fig. 8

| C... | Trade... | I... | Symbol | Range | Last news time |
|---|---|---|---|---|---|
| 157 | 6:27:27 | ↓1m | NILE | 0.78 | 4:24:14(S.TK) |
| 79 | 6:27:27 | ↓3m | NILE | 0.78 | 4:24:14(S.TK) |
| 11 | 6:27:00 | ↓1m | WFC | 0.61 | 1:05:36(S.TK) |
| 4 | 6:25:32 | ↑3m | WFR | 0.93 | |
| 11 | 6:25:32 | ↑1m | WFR | 0.95 | |
| 6 | 6:25:32 | ↑3m | WFR | 0.95 | |
| 10 | 6:25:32 | ↑1m | WFR | 0.94 | |
| 5 | 6:25:32 | ↑3m | WFR | 0.94 | |
| 9 | 6:25:32 | ↑1m | WFR | 0.93 | |
| 7 | 6:25:05 | ↑1m | WFR | 0.88 | |
| 7 | 6:23:26 | ↓1m | WFC | 0.67 | 1:05:36(S.TK) |
| 6 | 6:23:26 | ↓3m | WFC | 0.67 | 1:05:36(S.TK) |
| 5 | 6:23:26 | ↓3m | WFC | 0.68 | 1:05:36(S.TK) |
| 6 | 6:23:26 | ↓1m | WFC | 0.68 | 1:05:36(S.TK) |
| 170 | 6:23:30 | ↓1m | DRYS | 0.29 | 4:30:47(S.FO) |
| 63 | 6:23:30 | ↓3m | DRYS | 0.29 | 4:30:47(S.FO) |
| 43 | 6:22:58 | ↑1m | GM | 0.55 | 5:28:32(S.PN) |
| 26 | 6:22:58 | ↑3m | GM | 0.55 | 5:28:32(S.PN) |
| 42 | 6:22:58 | ↑1m | GM | 0.55 | 5:28:32(S.PN) |
| 25 | 6:22:58 | ↑3m | GM | 0.55 | 5:28:32(S.PN) |
| 41 | 6:22:58 | ↑1m | GM | 0.54 | 5:28:32(S.PN) |
| 24 | 6:22:58 | ↑3m | GM | 0.54 | 5:28:32(S.PN) |
| 4 | 6:22:27 | ↓1m | WFC | 0.72 | 1:05:36(S.TK) |
| 29 | 6:22:11 | ↓1m | CFC | 0.18 | 11:26:23(S.TK) |
| 30 | 6:22:11 | ↓1m | CFC | 0.15 | 11:26:23(S.TK) |
| 13 | 6:22:11 | ↓3m | CFC | 0.15 | 11:26:23(S.TK) |
| 12 | 6:22:11 | ↓3m | CFC | 0.18 | 11:26:23(S.TK) |

MARKET DATA ALERT AND NEWS-DRIVEN ALERT SYSTEM

CROSS REFERENCE TO RELATED APPLICATIONS

None.

FIELD OF THE INVENTION

The present invention relates to software and a system for providing alerts or notices to a user, such as a trader or a daytrader, of market developments or changes, and news-driven notices, based on user-provided criteria or preferences provided in advance.

BACKGROUND OF THE INVENTION

In recent years, software has been developed to help traders, including daytraders, to sort through on a real time basis the voluminous market data being generated every day. For example, a trader interested in monitoring a particular stock on the New York Stock Exchange may wish to be notified in real time when the symbol associated with the stock reaches a 52-week high, or a 52-week low, or comes within a pre-specified percentage from the 52-week high or 52-week low. Software has been developed to provide real time alerts based on user-provided criteria for such situations. For example, the Trade-Ideas software allows a user to specify symbols in which he is interested and various events associated with the symbol will generate an alert. NexTrend has also provided the Filescan product to provide a similar service.

Traders, however, still face a problem of receiving too many alerts ("noise"), and not enough quality or relevant information of the type that is of interest to them upon which trades are warranted ("quality signals"). A related problem is that systems known to date do not provide a sufficient level of granularity to the trader to allow for customization—to generate alerts tailored to the needs to the user. For example, instances of a certain market pheonomenon may be repeated and the user may wish to focus only when they follow within a certain period of time. Further, combinations of user criteria in connection with a given symbol for generating an alert are not sufficiently provided for in current market alert systems. In addition, the user may wish to be alerted when news affecting companies or securities is reported.

SUMMARY OF THE INVENTION

A system, method, apparatus, means, and processor readable medium incorporating a program of instructions for providing a user alert based on market data are disclosed. The program includes: instructions for receiving a first user selection of a first market event setting designating a market event, the market event comprising a market item of at least one of a predefined value, predefined ratio, predefined range, predefined average, aggregate value, aggregate ratio or aggregate range; instructions for receiving user input specifying a maximum period of time; instructions for receiving a first market signal corresponding to the first market event occurring at a first moment in time at a first value and to receive a second market signal corresponding to the first market event occurring at a second moment in time at a second value, the first moment in time being before the second moment in time, the second value being different from the first value; and instructions for generating and to provide the user alert only when the second moment in time occurs within the maximum period of time after the first moment in time.

The instructions for receiving the user input specifying the maximum period of time may receive the maximum period of time specified in seconds, minutes, hours or days by a user.

In addition, such a program may further include instructions for providing a user interface configured to provide the user alert, the user interface including a plurality of market event settings, each market event setting of the plurality of market event settings corresponding to a market event, and further including a plurality of filter values, each filter value of the plurality of filter values specifying one of a minimum value or a maximum value; instructions for receiving a first user selection of at least one market event setting of the plurality of market event settings; instructions for receiving a second user selection of a first filter value of the plurality of filter values; and the instructions for generating and providing the user alert are used to generate and to provide the user alert only if a third market signal indicating the market event corresponding to the at least one market event setting at the first filter value is received.

The program may also include instructions for receiving a third user selection of a second filter value of the plurality of filter values; and the instructions for generating and providing the user alert may generate and provide the user alert only if the third market signal indicates that the second filter value is also satisfied by the market event.

Also provided is a system, method, means, apparatus, and processor readable medium incorporating a program of instructions for providing a user alert based on market data, the program comprising: instructions operable to provide a user interface with a plurality of market event settings, each market event setting of the plurality of market event settings corresponding to a market event, the market event being based on a market price, an aggregate market value, a market ratio, or a market price range, and the user interface further including a plurality of filter values, each filter value of the plurality of filter values specifying one of a minimum value or a maximum value; instructions for receiving a first user selection of at least one market event setting of the plurality of market event settings; instructions for receiving a second user selection of a first filter value; instructions for receiving a third user selection of a second filter value, the second filter value specifying a minimum period of time since a receipt of a first market signal indicating an occurrence of the at least one market event; instructions for generate and providing the user alert only if both of the following conditions are true: (1) a second market signal indicating the market event corresponding to the at least one market event setting at the first filter value is received, and (2) the second market signal is received after the expiration of the period of time since the receipt of the first market signal.

The first filter value may be for example a dollar value, a percentage value or a quantity of securities value. The period of time may be an interday interval expressed in a number of days or weeks. For example, the period of time may be an intraday interval expressed in seconds, minutes or hours.

In a second embodiment, provided is a system, method, means, apparatus, and a processor readable medium incorporating a program of instructions for providing a user alert based on news data, the program comprising: instructions for receiving as a first user selection a news filter of a plurality of news filters, each filter of the plurality of news filters specifying a corporate event; instructions for receiving as a second user selection a maximum period of time since an occurrence of the corporate event; and instructions for generating and providing the user alert only when business news content indicates that the event specified has occurred within the maximum period of time.

In such a program, the news filter may be one or more of a stock upgrade, a stock downgrade, a securities dividends or earnings report, a report of a corporate takeover or merger, a report of a corporate acquisition, a report of a corporate bankruptcy, a report of a corporate product release, a report of a corporate product change in market share, or a report of a rumor regarding a corporation.

Such a program could also include instructions for receiving as a third user selection a symbol corresponding to a company; and the instructions for generating and providing the user alert are used to generate and to provide the user alert only if the corporate event specified relates to the company.

Such a program may further include instructions for receiving as a third user selection a market event setting of a plurality of market event settings, each market event setting of the plurality of market event settings corresponding to, for example, a market event based on a market price, an aggregate market value, a market ratio, or a market price range; such that the instructions for generating and providing the user alert are used to generate and to provide the user alert only when a market signal indicating an occurrence of the market event is received.

Such a program may further include instructions that provide a user interface configured to provide the user alert, the user interface including the plurality of news filters, each news filter being user selectable from the plurality of news filters.

The instructions for generating and providing the user alert may also provide in the user alert a live link directly linking to a news release including the corporate event.

Also contemplated is a system, method, means, apparatus, and a processor readable medium incorporating a program of instructions for providing a user alert based on news data, the program comprising: instructions for receiving as a first user selection a news filter of a plurality of news filters, each filter of the plurality of news filters specifying a corporate event; instructions for receiving as a second user selection a market event setting of a plurality of market event settings, each market event setting of the plurality of market event settings corresponding to a market event; and instructions for generating and providing the user alert only when business news content indicates that the corporate event has occurred and a market signal indicating the market event corresponding to the at least one market event setting is received.

The news filter may be a stock upgrade, a stock downgrade, a securities dividends or earnings report, a report of a corporate takeover or merger, a report of a corporate acquisition, a report of a corporate bankruptcy, a report of a corporate product release, a report of a corporate product change in market share, or a report of a rumor regarding a corporation, or a combination of the foregoing, or any some such news story.

In such a program, there could also be instructions for receiving a third user selection of a symbol corresponding to a company, so that the instructions that generate and provide the user alert do so only when the corporate event specified relates to the company.

In this program, instructions could also be included to provide a user interface configured to provide the user alert, the user interface including the plurality of news filters, each news filter being user selectable from the plurality of news filters.

The user interface may also allow the user to set a maximum count or a minimum count for the number of alerts that will be generated based on essentially the same news story or report. Also, a count of the number of news sources reporting the same news story or report can be displayed in the alert for the user.

Also in this program there could be included instructions to provide a list of companies that meet a user-specified condition; instructions operable to receive as a third user selection a symbol corresponding to a company from the list of companies provided; so that the instructions for generating and providing the user alert do so only when the corporate event specified relates to the company.

Additionally, the program could include instructions that provide a list of companies that meet a user-specified condition, and instructions operable to receive as a third user selection a selection from the list of companies provided.

Other features and advantages of the present disclosure will become apparent from the following description of the disclosure that refers to the accompanying drawings.

BRIEF DESCRIPTION OF THE DRAWINGS

FIG. 1 shows the signals criteria that may be selected via the user interface according to an aspect of Applicant's invention.

FIG. 2 illustrates the filter criteria that may be selected via the same user interface according to an aspect of Applicant's invention.

FIG. 4 illustrates examples of alerts generated according to an aspect of Applicant's invention.

FIG. 6 illustrates an interface for entering criteria for a news alert feature according to an aspect of Applicant's invention.

FIG. 7 illustrates another page of the news alert interface according to an aspect of Applicant's invention.

FIG. 8 illustrates a news driven alert list according an aspect of Applicant's invention.

Figure 3:
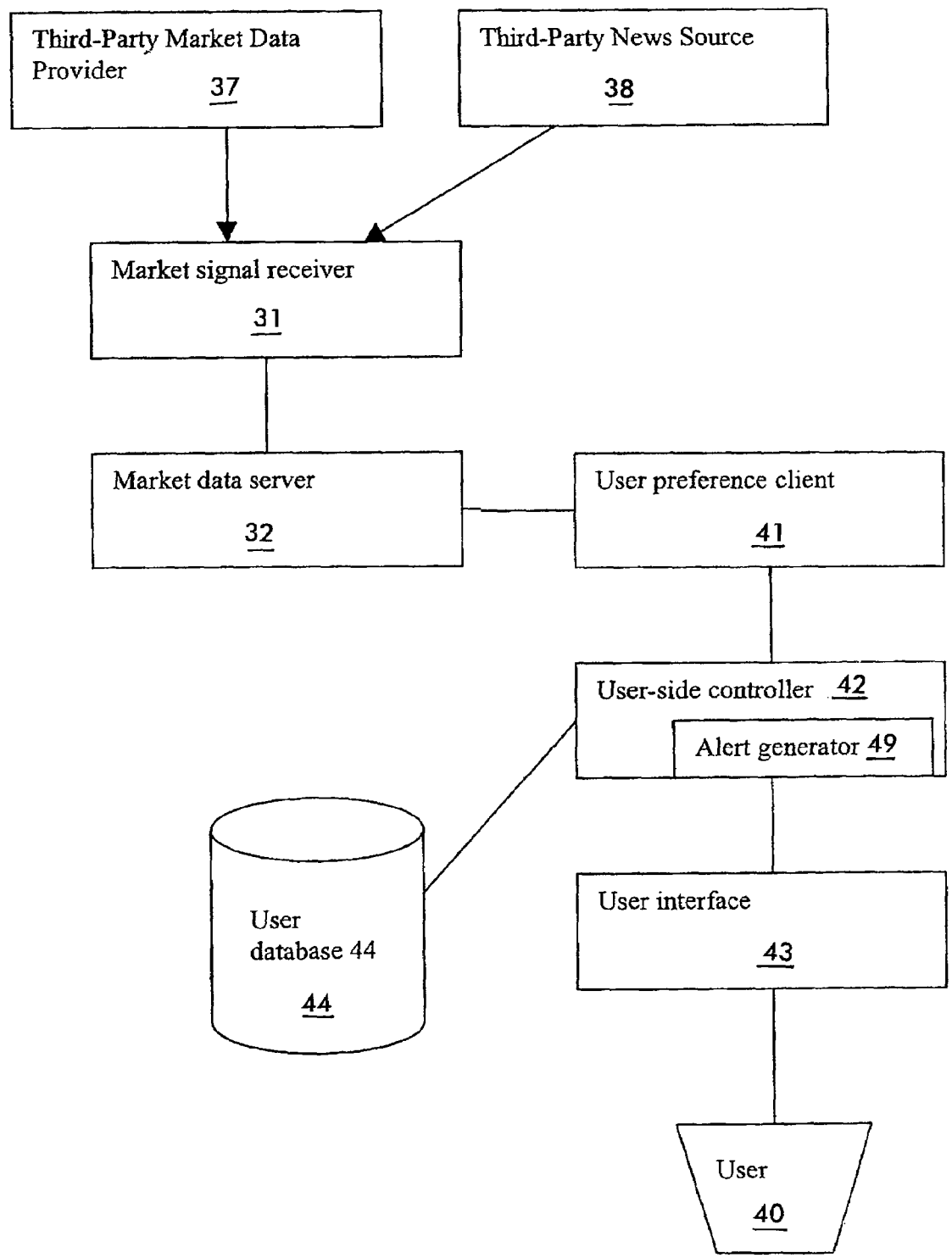
FIG. 3 is a schematic illustration of major structures of a system according to an aspect of Applicant's invention.

With reference to the Drawings, the features thereof are described below.

DETAILED DESCRIPTION OF EMBODIMENTS OF THE INVENTION

A first major embodiment of Applicant's invention will be described with reference to FIGS. 1-4.

FIG. 1 illustrates a list of "signals" which may be selected by the user through the user interface. Signals as used herein means a market event in connection with one or more symbols. For example, a user may be interested in signal 12 "New High" and a second signal 14 "New Low," which correspond to a new high or new low made by any symbol floating on the New York Stock Exchange, and may thus wish to check off signal 12 and additional signal 14 in the signals portion of the user interface shown in FIG. 1. Signal 12 and signal 14 each have an additional field "Minimum Day" 13 associated with them, which may specify the number of trading days to be considered in determining whether a new high or a new low has occurred. The trader may also be interested in additional signals 16 indicating a new pre-market high, a new pre-market low, a new post-market high or a new post-market low or an at pre-market or post-market high or an at pre-market or post-market low, respectively. Once the user has selected the signals which are to serve as the basis for generating alerts, the user can select the filters portion of the user interface by selecting the filters button or tab at the top of the page shown in FIG. 1. Many other types of signal may be selected as will be discussed below.

FIG. 2 shows the filters criteria that the user may select as the basis for generating alerts. For example, the user may be interested in the signals selected only if they occur a within a maximum of 10 seconds after a previous instance of the same signal. When the Maximum Seconds filter 24 is selected, the number of seconds between a first market event corresponding to a signal and a second market event corresponding to the same type of signal is measured and an alert is generated only if the number of seconds between the first event and the second event is not more than the maximum number of seconds specified. Thus, if symbol ABCDE makes a new high at time X it meets the criterion for signal 12 selected in FIG. 1 and if the same symbol ABCDE makes another new high within 10 seconds then an alert is generated. If the second new high is generated more than 10 seconds after time X then no alert is generated. Essentially, what the trader is interested in is significant movement of a symbol, not mere isolated movement which the trader may regard as "noise." The trader in this case sets the filters so that no alerts are generated unless a new high is reached and a second new high of the same symbol is reached within the allotted number of seconds.

Similarly, Minimum Seconds (not selected in this case but shown as having no amount of seconds specified) is a filter that allows the user to specify the minimum seconds that must elapse between an instance of a signal and a second instance of the same signal for generating an alert. The Minimum Seconds filter 26 allows the user essentially to say, "If the signal, for example, the new high of a symbol, occurs after the same new high of the same symbol within a few seconds, then it is really the same event and I do not want to be bothered again with such an alert." Thus, while the "Max Seconds" filter 24 may be thought of as allowing the user to identify real significant movement, the "Minimum Seconds" filter 26 may be thought of as allowing the user primarily to reduce noise or repetitive alerts about essentially the same market developments.

The selected filters, in this case the Max Seconds signal 24 and the Minimum Average Daily Volume signal 28, will thus serve as the basis for a qualifying alert generated in conjunction with the signals selected in the portion of the interface shown in FIG. 1.

Accordingly, by the use of more carefully tailored alerts, fewer alerts may be provided to the client from the server and thus less communication bandwidth may be required by an operation of the system according to the present invention. Thus, higher quality alerts which provide less noise for the user may also produce a quicker communication time. Also, the client processor may require fewer CPU operations to provide the higher quality alerts for the user and generate less heat to provide the services according to the present invention.

FIG. 4 shows a set of alerts generated based on the signals selected in FIG. 1 and the filters selected in FIG. 2. The top row 51 is an alert generated and shows various types of information about the alert. The Icon column 52 shows the type of signal that served as the basis for generating it and is described more fully in the Description column 57. In this case, the "50" of the icon indicates a crossing above the 50-day moving average for the symbol CBB shown in the Symbol column 54. Column Trade Time 53 shows the time at which the signal that is the basis of this alert was triggered on the market. The Count column 55 may show the number of the alerts signaled, the ADV column 61 may present the multiple of the average daily volume, the Range column 56 may show the relation of the current value to the daily range, and the Value column 58 may show the most recent price of the symbol. The Real Time Volume column 59 may show the current trading volume as a fraction of the average trading volume for this time of day for this symbol. It will be understood that these columns are not essential and that one or may columns may be omitted, and other columns showing other types of alert related information may also be provided. Also, alerts may be provided in other formats and may be provided as audible information.

The Seconds column 60 shows the most recent time that this identical type of alert was generated. This provides the trader with an instant sense of how significant this alert is and works well in conjunction with the Maximum Seconds filter 24 discussed above.

In addition, using the maximum second feature, the user may elect to screen out alerts that would be generated after the second instance of the selected signal. That is, instead of burdening the user with alerts that would be generated within the max seconds period specified, the user may designate no further alerts even when more than two instances of the signal occur within the max seconds time period. Accordingly, just one alert would be generated but a column of the alert could show the number of times the signal criteria were satisfied.

It will be understood that the filters shown in FIG. 2 are merely examples of the types of filters that may be provided for user entry and the signals shown in FIG. 1 are also examples and many other types of such signals and filters are known.

A system for providing such user alerts will now be described with reference to FIG. 3. A market signal receiver 31 may be located at a central location of a vendor such as Madscan. The market signal receiver 31 may receive a stream of relevant market data throughout the trading day from third-party providers, for example, through a mass subscription with the New York Stock Exchange. FIG. 3 shows the Third-Party Market Data Provider 37, such as a server at the New York Stock Exchange, or any other stock domestic or foreign exchange, bond trading floor, commodities exchange, currency exchange, or any other type of exchange or combination of exchanges. Market signal receiver 31 may then provide the market data to market data server 32 in a format usable to market data server 32.

User 40 may specify the signals and filters in which the user is interested through user interface 43, parts of which are shown in FIGS. 1 and 2 for purposes of illustration. User-side controller 42 will then provide relevant data from the signals and filters selected to the user preference client 41, which would pass them on to the market data server 32 at the central location. In return, market data server 32 would provide to the user preference client 41, typically at the user side, market data that are of the general type responsive to the user preferences as entered in the user filters and the user signals. For example, market data server 32 could provide signals information for all user-specifiable signals to allow the user-side components to generate alerts. User-side controller 42 would then pass on such responsive data to the alert generator 49 which would collate the information necessary for the generation of the alert and display it to the user 40 through the user interface 43. Alternatively, the market data server 32 could house the alert generator 49 module and provide the user preference client 41 with a more specific, tailored set of data necessary for displaying the alert by user interface 43. The user database 44 would house some of the software and user subscription information that are not necessary in real time. However, it will be understood that the system shown in FIG. 3 is but one embodiment of the system according to the present invention and many modifications, combinations and versions are possible to configure a system that would carry out the functions and embody the structures of the present invention.

Market data server 32 and user preference client 41 may communicate via the World Wide Web or they may communicate through a LAN, a WAN or a wireless connection over a wireless network. Similarly, market signal receiver 31 may communicate with the Third-Party Market Data Provider 37 and with the Third-Party News Source 38 via the World Wide Web or another type of internet connection, or they may be connected via a LAN, a WAN, or a wireless network.

More or less of the functionality provided by the system according to the present invention may be provided centrally by the market data server 32. Thus, at one extreme, the user 40 may communicate via a simple web browser or via a wireless network connection, such as a mobile telephone network using a handheld device, with the market data server 32, and the market data server 32 could provide all of the functionality above-described with respect to the user-side controller 42, the alert generator 49, the user database 44 and the user interface 43. At the other extreme, market data server 32 could stream all relevant market data to the subscriber node, the subscriber node including the user preference client 41, the user-side controller 42, the alert generator 49, the user database 44 and the user interface 43, and thus, most or all of the functionality provided by a system according to the present invention could be provided on the user side. Between these two extremes, various configurations are possible to share the search for relevant data in the data streams from the Third-Party Market Data Provider and the Third-Party News Source 38 and to generate the alerts based on the criteria set by the user 40. In another configuration, a centrally located system, such as at a larger trading company or trading floor, may house in one location all of the server side and user side components shown in FIG. 3. It will be noted that, although shown as separate modules, each of the units shown in FIG. 3 may be embodied as one or more computers or processors or several of the units shown in FIG. 3 may be provided by one computer. For example, typically the user preference client 41, the user-side controller 42, the alert generator 49, the user database 44 and the user interface 43 will be provided as a single processor with which the user 40 may interact to set signal information, filter information and other preferences and to receive alerts via the user interface 43.

Also, according to another aspect of this embodiment of the present invention, various signals, such as 52-week high, 52-week low, daily and interday moving averages or the like could be combined with additional restrictive criteria that would be required to be met to generate an alert, thus reducing the noise and improving the quality of the alerts provided.

According to this aspect of the invention, the user could provide a minimum of a number of days or an amount of an intraday period (expressed in seconds, minutes or hours) since this signal was last crossed. Thus, the user is able to further define the event for certain signals by specifying an AND function of days/intraday period since the last crossing event of the type specified. For example, as shown in FIG. 1, the Minimum Day selection 13 allows the user to specify the number of minimum days since a market event corresponding to the New High signal 12 (or the New Low signal 14) has occurred if this alert is to be generated. If the minimum number of days specified at selection 13 has not elapsed, then no alert will be generated, even if a new high (or a new low) occurs.

The connection between the client 41 and the market data server 32 may be provided by a traditional socket connection using port 80 using an HTTP protocol and TCP/IP. According to one aspect of the Applicant's invention, the client 41 may provide the market data server 32 with a list of signals, requested signals, that have been selected by the user as well as some but not all of the filters designated by the user. The market data server 32 can then provide the client 41 with codes for filters in connection with the requested signals. The market data server 32 can also provide quantity information in connection with each of the requested signals for generating the alerts by the client 41. Accordingly, the market data server 32 may be provided the requested signals but not know many or all of the filters selected by the user. In addition, the market data server 32 may be additionally given some types of filters selected by the user, such as those requiring more raw input data, such that the burden of generating alerts is shared by the market data server 32 and client 41, with the client having the larger burden.

In addition, the market data server can generate and maintain statistical information and historical information, including user preference data for subscribers, for the purposes of system enhancement, security, marketing, pricing or the like.

It will be understood that such minimum day selection 13 may be used together with the filters selected to provide for a more powerful market alert system because the alert generated is more meaningful for the user. The user, according to an aspect of the present invention, is given more control over the nature of the alerts generated through a finer level of granularity of a combination of criteria that must be met for alert generation. In the example shown in FIGS. 1 and 2 for purposes of illustration, an alert will be generated based on the New High signal 12 if the Minimum Day selection 13 (in this case set to zero and so non-applicable) and either of the maximum seconds filter 24 set at 10 seconds or the minimum average daily volume filter set at 200,000 shares is satisfied.

Second Embodiment

Traders are often concerned about recent company events, such as news of mergers and acquisitions, takeovers, IPOs, dividend releases, labor actions, or the like, or rumors of any of the foregoing, when making real time trade decisions. Therefore, real time alerts based on recent news stories could provide a real advantage. Provided is a system that generates alerts based on news stories from third-party news sources.

Figure 5:
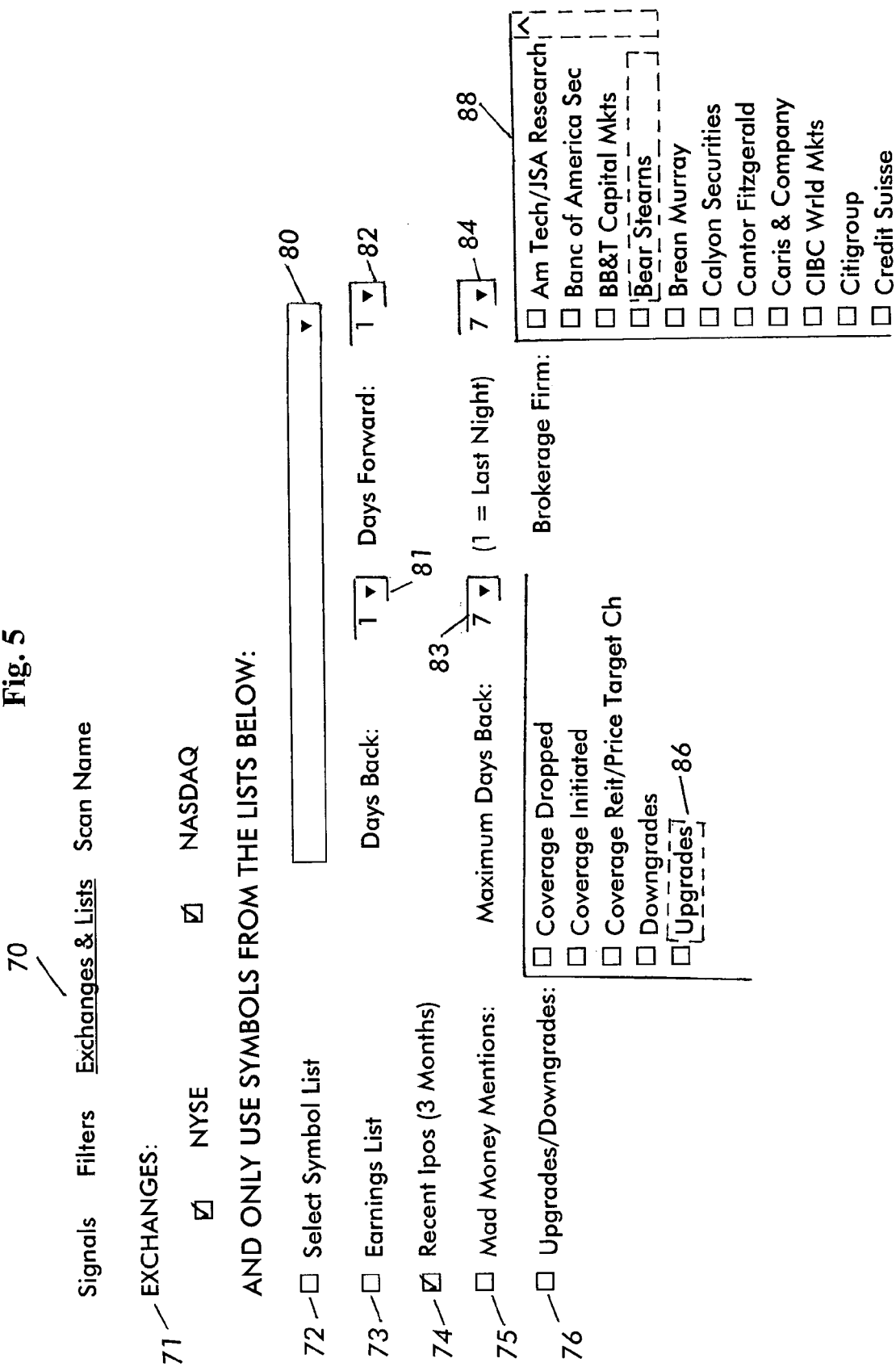
FIG. 5 shows the population of exchanges and lists according to another aspect of Applicant's invention.

As shown in FIG. 5, in an illustrative embodiment, the user can select the "Exchanges and Lists" tab in the user interface 43 and make the selections in which the user is interested. In conjunction with these selections, the user can also select the signals and optionally also the filters as the basis for this alert.

For example, the user may be interested in stocks that have been upgraded/downgraded in the last X minutes or seconds, have had earnings released in the last X minutes or seconds, about which a rumor has been generated in the last X minutes or seconds, have been mentioned as takeover candidates in the last X minutes or seconds, have been mentioned as having their price target changed in the last X minutes or seconds, have been mentioned as going public (being the subject of an IPO) in the last X minutes or seconds, or the like. Many other types of such news events are possible and news events relevant to the perceived value of a stock, a bond or other type of security, are too numerous to mention here but would be readily understood. Also, the user may be interested in any news in connection with a signal or any news in connection with a particular company and may wish to have alerts generated accordingly. The user can then select a signal and one of the foregoing news filters, for example, a 52-week low could be the signal and upgraded in the last X minutes or seconds, could be the criteria for generating the alert.

As shown in FIG. 5, if the user is interested in recent IPOs, in this instance, recent being set to the last three months, on either the New York Stock Exchange or NASDAQ, he would make the selections shown in FIG. 5 and then optionally he could also select one or more signals, and optionally one or more filters as the criteria for generating the alert. Also shown in FIG. 5 is news selection field 72 "Select Symbol List" which allows the user to specify the symbols of the companies in which he is interested. It will be understood that, throughout the disclosure, stock market examples are provided so that symbols refer to individual companies. However, the symbols may refer to ETFs or other types of closed-ended funds, bonds or bond funds, other types of securities or securities funds, currencies or currency funds, commodities or commodity funds, other types of publicly-traded items, or any type of market item.

In conjunction with news selection field 72, through window 80, the user may select a list of symbols either manually entered or populated automatically in window 80. News selection field 73 "Earnings List" allows the user to select companies which have reported an earning, such as a dividend, to be listed. In conjunction with news selection field 73, selections 81 and 82 allow the user to specify the time period, either selection 81, "Days Back," the number of days in the past during which the earnings were reported, or selection 82, "Days Forward," the number of days in the future during which the earnings will be posted.

Such market news would be provided in real time by third-party vendors, such as Reuters, Business News, Smart Money, Bloomberg or the like. Third-Party News Source 38 would provide news sources to market signal receiver 31, or to a parallel interface not shown other than the interface through which the Third-Party Market Data Provider 37 provides its stream of market data. The news reports would then be delivered to market data server 32, or in another embodiment, to a parallel server different from the one that receives the market data from the Third-Party Market Data Provider 37. The user preference client 41 would then obtain lists of symbols or companies in various categories, such as a list of companies which had been the subject of IPOs in the last three months, a list of Mad Money mentions, and so forth for use in generating alerts. As discussed, much of the functionality provided by the system could be provided by either the market data server 32 centrally or on the user side depending on a number of design considerations, such as the likely needs of the user, the type of subscription agreements purchased by the user, the type of device used by the user, the bandwidth of the connection between the market data server 32 and the user preference client 41, the number of users using the system, and other such considerations. Thus, as discussed above, much of the functionality, including the alert generator 49, could be moved to the market data server 32 to provide the news-driven alerts, without departing from the spirit of the present invention.

Certain users may also be interested in the recommendations of various commentators in making trading decisions. News field selection 75 allows the user to generate alerts based on the recommendations of one or more commentators, as in the illustration provided, based on the companies recommended by the television stock trading show "Mad Money." In conjunction with news field selection 75, the user may also specify how recent the time period must be during which the recommendation must have been made. Thus, selection 83 allows the user to specify the maximum number of days back during which the recommendation must have been made if an alert is to be generated, and selection 84 allows the user to select only those companies mentioned in the most recent Mad Money broadcast.

News field selection 76 "Upgrades Downgrades" allows a user to generate alerts for companies for which an upgrade or a downgrade has been reported. In conjunction with news field selection 76, the user can finetune the type of upgrade or downgrade in which the user is interested through selection 86. Also, through selection 88, the user is given the option of finetuning the type of upgrade or downgrade news in which he is interested by, for example, selecting the brokerage firm through which the upgrading or downgrading occurs. As discussed, many other types of company news, or currency or commodity or bonds or other market news, are also contemplated as options to be selected by the user.

Selection 88 shows a list of brokerage firms in conjunction with the news field selection 76 "Upgrades Downgrades." In a similar fashion, also contemplated is a feature by which a list of stocks relevant to a selection criterion would be shown to the user. Thus, if the user selects recent IPOs, a list of all companies that had been recently the subject of an IPO would be shown to the user and then the user can select "all" or "some" of the list of companies in conjunction with a signal, or optionally in conjunction also with a filter to generate the alert. Similarly, the user, upon selecting news field selection 75 would be given a list of companies that were mentioned as good buys on the show Mad Money within the time period specified by the user and then the user can select one or more or all of the recommended companies as the basis for an alert. Such a pre-populated list of companies displayed to the user in conjunction with the news field selection facilitates the user's ability to finetune alerts and speeds up the criterion selection process since the user does not have to compile the list from scratch. Such a pre-populated list could also be generated with respect to other types of news events, such as upgrades or downgrades, stocks of a specific sector or country, stocks that have reported earnings, stocks that have been the subject of takeover rumors, stocks that have reported significant market share increase, stocks that have reported significant profits in the most recent quarter, and so forth.

Alerts generated based on news would also include a field in which the news source providing the relevant news would be displayed. FIG. 8 shows an alert 51A in which column 61 provides information about the news item. Field 132 of column 61 shows the time at which the news story or report was generated or arrived at the market signal receiver 31 (shown in FIG. 3). Field 131 of column 61 indicates the source of the news story or report, in this case using initials of the third-party business news reporting agency. In addition, the news source name displayed as part of the alert could be clickable. Accordingly, if the user wishes to consult the news article which provided the basis for the alert to learn more about the news item, he could do so.

FIG. 6 shows an example of a news interface 101 through which the user can designate preferences for generating news-driven alerts 51a. Selection 102 allow as a user to select the maximum time period during which the news story or report must have been generated or received by market signal receiver 31 in order to serve as the basis for an alert. News sources fields 103 allow the user to designate the third party news sources which may serve as alerts. By way of example, some of the third party news sources shown are business wire 103a, PR News Wire 103b, Market Wire 103c, The Fly On The Wall 103d, Prime Zone 103e, Briefing 103f, Ten-K wizard 103g miscellaneous news source 103h, Canada Newswire 103i, and CCN Matthews 103j. In addition, FDA or other regulatory agencies may serve as news sources, as can press releases provided by companies and FCC filings or FCC releases. Further, stock markets or other exchanges or bourses, brokerage houses or industry associations may also provide news stories or reports that serve as a basis for news alerts. Through type of news selection 104, the user may specify what type of news is of interest to the exclusion of other types of news. Accordingly, by way of example, 104a earnings selection allows the user to express preference for news reporting earnings, or non-earnings of a company, market, industry, sector or geographic region, upgrades/downgrades selection 104b, FDA-Pharmaceuticals selection 104c, rumors selection 104d and all other news 104f allows the user to limit the news alerts generated based on these selections.

A news count setting (not shown) may also be provided to allow the user to input a minimum count or a maximum count, indicating the number of alerts that will be generated based on essentially the same news report or news story being reported by different news sources. Thus, the user may wish to specify in the max count input the maximum number alerts that will be generated by essentially the same news story or report when more than one news source reports that story. For example if a news story is released or received by the system about a particular company or symbol at 8:30 a.m. and the alert and filter criteria selected by the user are met then an alert will be generated as shown in FIG. 8.

If the time since press release input box 102 of FIG. 6 is selected then the alert will be generated only if the news item was released or received by the system within the time set, in this example shown as in the last 30 minutes. Then, if an additional news story involving that stock or symbol is released or received by the system and the signal and filter criteria selected by the user are again satisfied then a second alert will be generated provided that the alert and filter criteria are satisfied within 30 minutes of the second news story release or receipt.

FIG. 9 shows a news-driven alert 51b that includes the identifier of the news source 131a and a count 131b showing the number of news sources that have provided news stories or reports about this company, symbol or other item exchanged on a market. However, since the max count input box 105b is set at 2, no further alert will be generated for the company or symbol in question. In addition, a time that has elapsed since the first breaking of the story today about this company or symbol may also be provided as part of the alert (not shown).

FIG. 7 illustrates a news lists interface that allows the user additional control over the news-driven alerts to be generated. Symbol list selection 110 allows the user to enter symbols in connection with which the news story or report must be generated to generate an alert. Selection 111 allows the user to enter a personal list of symbols in which he or she is interested or allows the system to provide a candidate list of symbols based on prior user history, the type of news selected using selection 104, or by providing a complete list based on the exchange selected, a selection of recommendation of an analyst, or allows the user to select more than types of such symbols from the list. Earnings list selection 112 allows the user to specify an interest only in news stories or reports related to earnings. Day's back selection 113a and day's forward selection 113b allow the user to specify the number of days backward or forward in time during which the earnings related news stories are of interest. Similarly, selection 112b allows the user to select the type of earnings in which there is an interest for generating an alert: selection 114 allows pre-market or post-market related news from yesterday, selection 115 allows pre-market, market or post-market related earnings news from today, and selection 116 allows pre-market, market or post-market related news for tomorrow. It will be understood that other time periods may be specified and these time periods are provided as examples only. Recent IPO selection 121 allows the user to designate an interest in IPO's, for example, IPO's in the last three months, for which news stories or reports are generated. Mad Money Mentions selection 122 limits news sources to those symbols which were mentioned on the television show Mad Money. It will be understood that additional controls may allow designation of only symbols mentioned by another stock analyst or by a combination of stock analysts or the like, and the symbols could be limited to recommendations instead of mentions, and to "short" recommendations as well as "long" recommendations. The days back selection 125 controls how far back, for example, how many nights back, the Mad Money mention or recommendation must have been made. By selecting upgrades/downgrades selection 123, the user designates an interest only in those stories that involve upgrades or downgrades of a symbol.

It will be appreciated that a single source consolidator of third party news reporters can be the single news source for the news server of the system.

The system may also be set up to generate automatically alerts based on news stories received from news sources. For example, a news-driven alert can be generated if within a certain pre-specified period of time of the issue or receipt of the news story or report a trading volume increases significantly for the symbol or market-listed item mentioned in the story or report.

Further, if the trading volume exceeds a certain pre-specified threshold or increases by a certain pre-specified percentage within 10 minutes, or within some other pre-specified period of time of the issue or receipt of the news story or report, then a news-driven alert can be generated.

For example, a running up on news story alert can be generated if the price or the average trading range (ATR) of a symbol or market-listed item changes by a certain amount within a pre-specified amount of time since the release, issue or receipt of the news report or story. For example, if within 10 minutes of the news story on a particular symbol, the price of the symbol increases by 50 cents (or some other user-specified or default amount) or increases by 10% of its average trading range (or some other user-specified or default percentage), an alert will be generated for the user based on the news story. Such an alert could include a reference, including a link, to the news story and will show the change in price or the change in the average trading range since the story. Other similar indicia of price or percentage increase can also be used, instead of (or in combination with) the price or the average trading range. Further, such a running up on news story alert can be generated only if within the 10-minute period since the news story (or within some other period of time) the symbol or other market-listed item has made one-minute highs or at least one one-minute high.

A similar running down on news story alert can also be generated in an analogous manner for when the symbol or market-listed item moves down since the news story. Thus, the running down on news story alert will generate an alert if within, for example, 10 minutes of a news story the symbol featured in the news story moves down 50 cents, or some other user-specified or default amount, or moves down a minimum percentage of its average trading range, and makes a one-minute low. It will be understood that the minimum price and the average trading range indicia of movement can be used individually or together in combination for generating the alert, that is, either they must be met individually or they must both be met for generating the alert. Similarly for the one-minute high or low.

Also contemplated is a news count feature which provides the user in the news-driven alert with the number of news stories or reports issued that day. Such a news count would include the number of news stories or reports from all sources available. Alternatively, the news count can keep track of the number of news sources reporting the news report or story about this symbol or market-listed item. Such a news count can provide the user with an idea of the import or effect of the news report or story as well as its freshness and hence relevance. Also, the alert can specify the elapsed time since the most recent news story about this symbol to provide the user with an indication of whether this news story is old. In addition, the amount of time or the number of minutes between the recent story and the penultimate story about this symbol can also be provided to give the user an idea of whether the most recent story provides new information about the event or symbol.

It will be understood that more than one selection of the foregoing type selections may be designated if the user is interested in a variety of types of news. In connection with the upgrade/downgrade selection, the user may select coverage dropped, coverage initiated, coverage REIT/price target change, downgrades or upgrades via selection 124 to further limit the upgrades or downgrades that will serve as a basis for generating news driven alerts. Similarly, brokerage selection 88 allows the user to designate the brokerages or firms handling the upgrades or downgrades in which the user is interested for generating news-driven alerts.

In addition to or instead of the selections made in the news related interface showing FIG. 7, the user is able to specify other filters that would serve as the basis for generating news-driven alerts. Thus, the user can generate primary filters, such as volume or other criteria, which together with the signals designated in the symbol list selection 110 will control what news-driven alerts are generated when a news story or report is reported for the symbol. That is, for the selected symbol, an alert will be generated if a news story or report in connection with the symbol is reported and meets the criteria specified by the signals and/or filters selected. Thus the user is empowered to specify and receive alerts based on news-driven events limited to the symbols and/or signals and/or filters the user specifies.

In addition, the user may designate secondary filters in addition to the primary filters shown in FIG. 7, the secondary filters being drawn from the list shown in FIG. 2 or from other similar criteria. This provides improved granularity for user selection of the criteria upon which news-generated alerts are generated. This allows a trader to "trade the news" based on news-driven alerts that meet the trader's pre-specified criteria, and thus obviating the need to watch for or listen to market-related news while trading.

Also contemplated is an auto-trade feature by which the user could click on an alert received and be guided to a user interface page through which he could place an order or execute a trade. That is, to make the alert system provided by the interface more trader-friendly, alerts provided could be actionable. Thus, as shown in FIG. 3, user preference client 41 may be additionally connected to a trade server 39 to receive an order placed by the user through user interface 43 in response to the alert selected by user. Trade server 39 could be connected via the internet or via other electronic means to a brokerage for executing the trade.

In addition, also contemplated is a grey-box or black-box embodiment in which alerts would automatically result in trades. Upon providing an alert, user interface 43 would display a box by which the number of shares could be selected by the user, or other trade information could be supplied by the user as the basis for placing the order.

Alternatively, as part of selecting the signals, filters or other selection criteria, the user could also select the other trade information necessary for executing the trade. Then, when the criteria are met, the alert could be displayed but, in any case, the trade would automatically be executed without further input from the user.

Although the present disclosure has been described in relation to particular embodiments thereof, many other variations, modifications, combination of features, and other uses will become apparent to those skilled in the art. It is preferred, therefore, that the present disclosure be limited not by the specific disclosure herein, but only by the appended claim.

What is claimed is:

1. A processor readable medium incorporating a program of instructions configured, when executed by an electronic processor, to provide a user alert based on market data received from an exchange data stream including data for a plurality of exchange-traded market items, the program comprising:
   instructions executed to receive, as a first user selection, a first market event setting designating a first market event, the first market event comprising a market item of the plurality of exchange-traded market items trading at at least one of a high value for a first predefined time designation, a low value for the first predefined time designation, a high value for an average or aggregate value for a second time designation, or a low value for the second time designation;
   instructions executed to receive user input specifying a maximum period of time;
   instructions executed to receive the market data comprising a first market signal corresponding to the first market event occurring at a first moment in time at a first value and to receive the market data comprising a second market signal corresponding to the first market event occurring at a second moment in time at a second value, the first moment in time being before the second moment in time, the second value being different from the first value; and
   instructions executed to generate and to provide automatically the user alert only when the second moment in time occurs within the maximum period of time of the first moment in time.

2. The processor readable medium of claim 1, wherein the instructions for receiving the user input specifying the maximum period of time are operable to receive the maximum period of time specified in seconds by a user.

3. The processor readable medium of claim 1, further comprising:
   instructions executed to provide a user interface configured to provide the user alert, the user interface including a plurality of market event settings, each market event setting of the plurality of market event settings corresponding to a respective market event,
   instructions executed to receive, as a second user selection, a first filter value specifying one of a maximum value or minimum value concerning the market event; and
   the instructions for generating and providing the user alert being operable to generate and to provide the user alert only when the market data comprising a third market signal is received indicating the market event corresponding to the at least one market event setting and occurring at the first filter value.

4. The processor readable medium of claim 3, wherein the first filter value is one of a dollar value, a percentage value or a quantity of securities value.

5. The processor readable medium of claim 3, further comprising:
instructions executed to receive, as a third user selection, a second filter value specifying one of a maximum value or a minimum value concerning the market event; and
the instructions for generating and providing the user alert are operable to generate and to provide the user alert only when the market data received indicates that the second filter value is also satisfied by the market event.

6. A processor readable medium incorporating a program of instructions configured, when executed by an electronic processor, to provide a user alert based on market data received from an exchange data stream including data for a plurality of exchange-traded market items, the program comprising:
instructions executed to provide a user interface including a plurality of market event settings, each market event setting of the plurality of market event settings corresponding to a market event, the market event being based on a market price, an aggregate market value, a market ratio, or a market price range, and the user interface further including a plurality of filter value settings, each filter value setting of the plurality of filter values settings configured to receive user input specifying one of a minimum value concerning the market event or a maximum value concerning the market event;
instructions executed to receive, as a first user selection, at least one market event setting of the plurality of market event settings;
instructions executed to receive, as a second user selection, a first filter value specifying one of the maximum value or the minimum value concerning the market event;
instructions executed to receive, as a third user selection, a second filter value, the second filter value specifying a minimum period of time that must elapse after a receipt of the market data comprising a first market signal indicating an occurrence of the at least one market event; and
instructions executed to generate and to provide automatically the user alert only when both of the following conditions are true: (1) the market data comprising a second market signal indicating the market event corresponding to the at least one market event setting and occurring at the first filter value is received, and (2) the second market signal is received after the expiration of the period of time since the receipt of the first market signal.

7. The processor readable medium of claim 6, wherein the first filter value is one of a dollar value, a percentage value or a quantity of securities value.

8. The processor readable medium of claim 6, wherein the period of time is an interday interval expressed in a number of days or weeks.

9. The processor readable medium of claim 6, wherein the period of time is an intraday interval expressed in seconds or minutes.

10. A processor readable medium incorporating a program of instructions configured, when executed by an electronic processor, to provide a user alert based on market data received from an exchange data stream and comprising data for a plurality of exchange-traded market items, and based on news data received from a news source, the news data comprising a business news story, a business news article, a report, a company financial filing, a government report, or a press release involving a market symbol for a market-traded item exchanged on an exchange, the program comprising:
instructions executed to receive, as a first user selection, a first market event setting designating a first market event;
instructions executed to receive the market data including data relating to the first market event;
instructions executed to receive the news data; and
instructions executed to generate and to provide automatically the user alert only when the market data indicate that the first market event has occurred and relates to the market symbol indicated by the news data received.

11. The processor readable medium of claim 10, further comprising:
instructions executed to receive, as a news filter, a user selection designating at least one of stock upgrade news, stock downgrade news, securities dividends news, corporate earnings news, corporate takeover or merger news, corporate acquisition news, corporate bankruptcy news, corporate product release news, corporate product change news, change in market share news, labor action news, regulatory agency news, industry sector news, country or geographic region news, initial public offering news, stock recommendation news, corporate securities filing news or rumor regarding a corporation news,
wherein the instructions for generating and providing the user alert are operable to generate and to provide the user alert only when the news data indicate an event related to the news filter.

12. The processor readable medium of claim 10, further comprising:
instructions executed to receive, as a second user selection, the market symbol,
wherein the instructions for generating and providing the user alert are operable to generate and to provide the user alert only when the market event specified relates to the market symbol.

13. The processor readable medium of claim 10, further comprising:
instructions executed to receive as a filter user selection a second market event setting corresponding to a market event based on a market price, an aggregate market value, a market ratio, or a market price range,
wherein the instructions for generating and providing the user alert are operable to generate and to provide the user alert only when the market data indicate an occurrence of the second market event is received.

14. The processor readable medium of claim 10, further comprising:
instructions executed to provide a user interface configured to provide the user alert, the user interface including the plurality of news filters, each news filter being user selectable from the plurality of news filters.

15. The processor readable medium of claim 10, wherein the instructions for generating and providing the user alert are further operable to provide in the user alert a live link directly linking to a news release including the corporate event.

16. A processor readable medium incorporating a program of instructions configured, when executed by an electronic processor, to provide a user alert based on news data, the program comprising:
instructions executed to receive from a news provider news data, the news data comprising a business news story, a business news article, a report, a company financial filing, a government report, or a press release involving a market-related entity; and instructions executed to receive market data from an exchange data stream including market signals for a plurality of exchange-traded market items including the market-related entity, and to generate and to provide automatically the user alert only when a first market signal of the market data indicate that a trade volume of the market-related entity has changed by a pre-specified amount or percentage or has exceeded a user-defined pre-set threshold amount or percentage of trading volume.

17. The processor-readable medium of claim 16, wherein the alert is generated only when the change in the trade volume occurs within a pre-defined period of the receipt of the news data from the news provider.

18. The processor-readable medium of claim 16, wherein the alert is generated only when the change in the trade volume is accompanied by a change in price of the market-related entity by a pre-specified amount or percentage for the market-related entity.

19. The processor-readable medium of claim 16, wherein the alert includes a news count indicating a number of news reports, stories or sources reporting the news data for the market-related entity.

20. The processor-readable medium of claim 16, wherein the alert includes an indication of a number of minutes between a final news report and a penultimate news report.

21. The processor-readable medium of claim 10, wherein the user alert is provided on a display providing a view comprising at least one line, the line providing information related to the market-traded item and comprising dynamically updated fields containing information for the market symbol to provide real time data for the user.

22. The processor-readable medium of claim 21, wherein a field of the dynamically updated fields include a fifty-two (52) week high information about the market symbol, fifty-two (52) week low information about the market symbol, last trade price information about the market symbol, net change information about the market symbol, percent change information about the market symbol or volume traded information about the market-traded item.

23. The processor-readable medium of claim 16, wherein the user alert is provided on a display providing a view comprising at least one line, the line providing information related to the market symbol and comprising dynamically updated fields containing information for the market-traded item to provide real time data for the user.

24. The processor-readable medium of claim 23, wherein a field of the dynamically updated fields include fifty-two (52) week high information about the market symbol, fifty-two (52) week low information about the market symbol, last trade price information about the market symbol, net change information about the market symbol, percent change information about the market symbol or volume traded information about the market-traded item.

25. The processor-readable medium of claim 10, wherein the user alert includes information about the most recent price of the market symbol.

26. The processor-readable medium of claim 10, wherein the user alert includes information about a change of a price of the market-traded item or about a change of a volume traded of the market-traded item since a release of the news data, the change expressed as an amount of change or as a percentage of change.

27. The processor-readable medium of claim 10, wherein the news data is received from a third party vendor news source.

28. The processor-readable medium of claim 10, wherein the news data is received from a news consolidator.

29. The processor-readable medium of claim 21, wherein the news alert is provided only when the news data were released within a pre-specified period of time or only when a news event specified by the news data occurred within the pre-specified period of time of the current time.

30. A processor readable medium incorporating a program of instructions configured, when executed by an electronic processor, to provide a user alert indicating a market-traded item, the user alert generated based on news data, the program comprising:
  instructions executed to receive, as a news user selection, a news category designating a type of business information contained in the news data or designating any type of business information contained in the news data;
  instructions executed to receive the news data; and
  instructions executed to generate and to provide automatically the user alert only when the news data were released within a pre-specified period of time of the current time and indicate an occurrence of a news event for the market-traded item within the news category selected.

31. The processor-readable medium of claim 30, wherein the pre-specified period of time is set by the user when setting the news user selection.

32. The processor-readable medium of claim 30, wherein the user alert is provided on a display providing a view comprising at least one line, the line providing information related to the market-traded item and comprising dynamically updated fields containing information for the market-traded item to provide real time data for the user.

33. The processor-readable medium of claim 30, wherein a field of the dynamically updated fields include fifty-two (52) week high information about the market-traded item, fifty-two (52) week low information about the market-traded item, today's high information about the market-traded item, today's low information about the market-traded item, last trade price information about the market-traded item, net change price information about the market-traded item, percent change price information about the market-traded item, or volume traded information about the market-traded item.

34. The processor-readable medium of claim 30, wherein the user alert includes information about a most recent price of the market-traded item.

35. The processor-readable medium of claim 30, wherein the user alert includes information about a change of a price of the market-traded item or about a change of a volume traded of the market-traded item since a release of the news data, the change expressed as an amount of change or as a percentage of change.

36. The processor-readable medium of claim 30, wherein the user alert includes information about how much time has elapsed since a release of the news data.

37. The processor-readable medium of claim 30, wherein the instructions executed to generate and to provide the user alert are further operable to generate and to provide information to the user based on additional news data received subsequent to the receiving of the news data based upon which the user alert was generated, the additional news data being most recent news data received for the market-traded item, the information indicating a time of a release of the additional news data.

38. The processor-readable medium of claim 37, wherein the user alert includes a time of a release of the news data based upon which the user alert was generated.

39. The processor-readable medium of claim 30, wherein the user alert includes information about an average volume traded since a release of the news data.

40. The processor-readable medium of claim 37, wherein the additional news data indicate the occurrence of the news event for the market-traded item.

41. The processor-readable medium of claim 30, wherein the instructions operable to generate and to provide the user alert based on the news data are further operable to generate and to provide information to the user indicating a count of reports received indicating the occurrence of the news event for the market-traded item.

42. The processor-readable medium of claim 30, wherein the news data comprises a business news story, a business news article, a data compilation, a report, a company financial filing, a government report, or a press release involving the market symbol.

43. The processor-readable medium of claim 30, wherein the news category includes at least one category of news of the group consisting of stock upgrade news, stock downgrade news, corporate earnings news, securities dividends news, and initial public offering news.

44. The processor-readable medium of claim 30, wherein the news category includes at least one category of news of the group consisting of stock recommendation news, corporate takeover news, corporate merger news, corporate acquisition news, corporate securities filing news, and corporate bankruptcy news.

45. The processor-readable medium of claim 30, wherein the news category includes at least one category of news of the group consisting of labor action news, regulatory agency news, industry sector news, country or geographic region news, corporate product release news, corporate product line change news, corporate market share change news, and rumor regarding a corporation news.

46. The processor-readable medium of claim 30, wherein the news data is received from a third party vendor news source.

47. The processor-readable medium of claim 30, wherein the news data is received from a news consolidator.

48. The processor-readable medium of claim 30, further comprising instructions operable to receive market data including data relating to a first market event,
wherein the user alert is generated and provided to the user only when the market data indicate that a price change of the market-traded item since a release of the news data exceeds a pre-specified threshold amount or a pre-specified threshold percentage.

49. The processor-readable medium of claim 30, further comprising instructions operable to receive market data including data relating to a first market event,
wherein the user alert is generated and provided to the user only when the market data indicate that a volume traded change of the market-traded item since a release of the news data exceeds a pre-specified threshold amount or a pre-specified threshold percentage.

50. The processor-readable medium of claim 30, further comprising instructions operable to receive market data including data relating to a first market event,
wherein the user alert is generated and provided to the user only when the market data indicate that an average volume traded change of the market-traded item since a release of the news data exceeds a pre-specified threshold amount or a pre-specified threshold percentage.

51. A method of providing user notification regarding a market-traded item, the user notification generated based on news data, the method comprising:
receiving, by an electronic user device, as a news user selection, a news category designating a type of business information contained in the news data or designating any type of business information contained in the news data;
receiving, by an electronic user device, the news data;
providing automatically the user notification only when the news data were released within a pre-specified period of time of the current time and indicate an occurrence of a news event for the market-traded item within the news category selected,
wherein the user notification is provided on a display providing a view comprising at least one line, the line providing information related to the market-traded item, including information about a change in a price of the market-traded item or about a change in a volume traded of the market-traded item, expressed as an amount of change or as a percentage of change, since a release of the news data, the at least one line comprising dynamically updated fields containing information for the market-traded item to provide real time data for the user.

52. The method of claim 51, wherein the pre-specified period of time is set by the user when setting the news user selection.

53. The method of claim 51, wherein the news category includes at least one category of news of the group consisting of stock upgrade news, stock downgrade news, corporate earnings news, securities dividends news, initial public offering news, stock recommendation news, corporate takeover news, corporate merger news, corporate acquisition news, corporate securities filing news, corporate bankruptcy news, labor action news, regulatory agency news, industry sector news, country or geographic region news, corporate product release news, corporate product line change news, corporate market share change news, and rumor regarding a corporation news.

54. A system configured to provide to a user interface of an electronic user device a user alert based on market data received from a computer transmitting an exchange data stream including data for a plurality of exchange-traded market items, the system comprising:
a user selection preference module of the electronic user device configured to receive from the user interface of the user device, as a first user selection, a first market event setting designating a first market event, the first market event comprising a market item of the plurality of exchange-traded market items trading at at least one of a high value, a low value, a high value based on an average or aggregate values, or a low value based on the average or aggregate values;
a user time input preference module of the electronic user device configured to receive from the user interface of the user device input specifying a maximum period of time;
a user control module configured to receive the market data comprising a first market signal corresponding to the first market event occurring at a first moment in time at a first value and to receive the market data comprising a second market signal corresponding to the first market event occurring at a second moment in time at a second value, the first moment in time being before the second moment in time, the second value being different from the first value; and
the user control module configured to receive data from the user input preference module and to generate and to provide automatically the user alert to the user interface of the user device only when the user control module determines that the second moment in time occurs within the maximum period of time of the first moment in time.

55. The system of claim 54, wherein the user selection preference module is configured to receive the user input specifying the maximum period of time specified in seconds by a user.

56. The system of claim 54, further comprising:
a user interface module configured to provide the user alert, the user interface module including a plurality of market event settings, each market event setting of the plurality of market event settings corresponding to a respective market event,
the user selection preference module being configured to receive, as a second user selection, a first filter value specifying one of a maximum value or a minimum value concerning the market event; and
the user control module being configured to generate and to provide the user alert only when the market data comprising a third market signal is received indicating the market event corresponding to the at least one market event setting and occurring at the first filter value.

57. The system of claim 56, wherein the first filter value is one of a dollar value, a percentage value or a quantity of securities value.

58. The system of claim 56, wherein the user selection preference module is further configured to receive, as a third user selection, a second filter value specifying one of a maximum value or a minimum value concerning the market event; and
the user control module is configured to generate and to provide the user alert only when the market data received indicates that the second filter value is also satisfied by the market event.

59. A system configured to provide to an electronic user device a user alert based on market data received from a computer transmitting an exchange data stream including data for a plurality of exchange-traded market items, the program comprising:
a user interface module of the user device, the user interface module being configured to provide to a user a plurality of market event settings, each market event setting of the plurality of market event settings corresponding to a market event, the market event being based on a market price, an aggregate market value, a market ratio, or a market price range;
the user interface module further configured to provide to the user a plurality of filter value settings, each filter value setting of the plurality of filter values settings configured to receive user input specifying one of a minimum value concerning the market event or a maximum value concerning the market event;
a user selection preference module configured to receive, as a first user selection, at least one market event setting of the plurality of market event settings;
the user selection preference module configured to receive, as a second user selection, a first filter value specifying one of the maximum value or the minimum value concerning the market event;
the user selection preference module configured to receive, as a third user selection, a second filter value, the second filter value specifying a minimum period of time that must elapse after a receipt of the market data comprising a first market signal indicating an occurrence of the at least one market event; and
a user control module configured to receive data from the user input preference module and to generate and to provide automatically the user alert to the user interface module of the user device only when the user control module determines that both of the following conditions are true: (1) the market data comprising a second market signal indicating the market event corresponding to the at least one market event setting and occurring at the first filter value is received, and (2) the second market signal is received after the expiration of the period of time since the receipt of the first market signal.

60. The system of claim 59, wherein the first filter value is one of a dollar value, a percentage value or a quantity of securities value.

61. The system of claim 59, wherein the period of time is an interday interval expressed in a number of days or weeks.

62. The system of claim 59, wherein the period of time is an intraday interval expressed in seconds or minutes.

63. A system configured to provide to an electronic user device a user alert based on market data received from a computer transmitting an exchange data stream and comprising data for a plurality of exchange-traded market items, and based on news data received from a processor transmitting data obtained from a news source, the news data comprising a business news story, a business news article, a report, a company financial filing, a government report, or a press release involving a market symbol for a market-traded item exchanged on an exchange, the program comprising:
a user selection preference module configured to receive a first user selection from a user interface operated on the user device, the first user selection including a first market event setting designating a first market event;
a user control module configured to receive the market data including data relating to the first market event;
the user control module configured to receive the news data; and
the user control module configured to generate and to provide automatically the user alert to the user interface of the user device only when the user control module determines that the market data indicate that the first market event has occurred and relates to the market symbol indicated by the news data received.

64. The system of claim 63, wherein the user selection preference module is configured to receive, as a news filter, a user selection designating at least one of stock upgrade news, stock downgrade news, securities dividends news, corporate earnings news, corporate takeover or merger news, corporate acquisition news, corporate bankruptcy news, corporate product release news, corporate product change news, change in market share news, labor action news, regulatory agency news, industry sector news, country or geographic region news, initial public offering news, stock recommendation news, corporate securities filing news or rumor regarding a corporation news; and
the user control module is configured to generate and to provide the user alert only when the news data indicate an event related to the news filter.

65. The system of claim 63, wherein the user selection preference module is configured to receive, as a second user selection, the market symbol; and
the user control module is configured to generate and to provide the user alert only when the market event specified relates to the market symbol.

66. The system of claim 63, wherein the user selection preference module is configured to receive as a filter user selection a second market event setting corresponding to a market event based on a market price, an aggregate market value, a market ratio, or a market price range, and wherein the user control module is configured to generate and to provide the user alert only when the market data indicate an occurrence of the second market event is received.

67. The system of claim 63, wherein the user interface module is configured to provide the user alert to the user, the user interface including the plurality of news filters, each news filter being user selectable from the plurality of news filters.

68. The system of claim 63, wherein the user control module is configured to provide in the user alert a live link directly linking to a news release including the corporate event.

69. A system configured to provide to an electronic user interface of a user device a user alert based on news data obtained from a computer transmitting data obtained from a news source, the system comprising:
  a user control module configured to receive from a news provider news data, the news data comprising a business news story, a business news article, a report, a company financial filing, a government report, or a press release involving a market-related entity;
  the user control module being further configured to receive market data from an exchange data stream including market signals for a plurality of exchange-traded market items including the market-related entity; and
  the user control module being further configured to generate and to provide automatically the user alert to the user interface of the user device only when the user control module determines that a first market signal of the market data indicate that a trade volume of the market-related entity has changed by a pre-specified amount or percentage or has exceeded a user-defined pre-set threshold amount or percentage of trading volume.

70. The system of claim 69, wherein the alert is generated only when the change in the trade volume occurs within a pre-defined period of the receipt of the news data from the news provider.

71. The system of claim 69, wherein the user control module is configured to generate the alert only when the change in the trade volume is accompanied by a change in price of the market-related entity by a pre-specified amount or percentage for the market-related entity.

72. The system of claim 69, wherein the alert includes a news count indicating a number of news reports, stories or sources reporting the news data for the market-related entity.

73. The system of claim 69, wherein the alert includes an indication of a number of minutes between a final news report and a penultimate news report.

74. The system of claim 63, wherein the user alert is provided on a display providing a view comprising at least one line, the line providing information related to the market-traded item and comprising dynamically updated fields containing information for the market symbol to provide real time data for the user.

75. The system of claim 74, wherein a field of the dynamically updated fields include a fifty-two week high information about the market symbol, fifty-two week low information about the market symbol, last trade price information about the market symbol, net change information about the market symbol, percent change information about the market symbol or volume traded information about the market-traded item.

76. The system of claim 63, wherein the user alert includes information about the most recent price of the market symbol.

77. The system of claim 63, wherein the user alert includes information about a change of a price of the market-traded item or about a change of a volume traded of the market-traded item since a release of the news data, the change expressed as an amount of change or as a percentage of change.

78. The system of claim 63, wherein the news data is received from a third party vendor news source.

79. The system of claim 63, wherein the news data is received from a news consolidator.

80. The system of claim 74, wherein the user control module is configured to transmit the news alert only when the news data were released within a pre-specified period of time or only when a news event specified by the news data occurred within the pre-specified period of time of the current time.

81. A system configured to provide to an electronic user interface of a user device indicating a market-traded item, the user alert generated based on news data, the program comprising:
  a user selection preference module configured to receive from the user interface, as a news user selection, a news category designating a type of business information contained in the news data or designating any type of business information contained in the news data;
  a user control module configured to receive as a transmission from a processor the news data; and
  the user control module configured to receive data from the user input preference module and to determine whether to generate and to transmit the user alert; and
  the user control module configured to determine, to generate and to transmit automatically the user alert only when the news data were released within a pre-specified period of time of the current time and indicate an occurrence of a news event for the market-traded item within the news category selected.

82. The system of claim 81, wherein the pre-specified period of time is set by the user when setting the news user selection.

83. The system of claim 81, wherein the user alert is provided on a display providing a view comprising at least one line, the line providing information related to the market-traded item and comprising dynamically updated fields containing information for the market-traded item to provide real time data for the user.

84. The system of claim 81, wherein a field of the dynamically updated fields include fifty-two (52) week high information about the market-traded item, fifty-two (52) week low information about the market-traded item, today's high information about the market-traded item, today's low information about the market-traded item, last trade price information about the market-traded item, net change price information about the market-traded item, percent change price information about the market-traded item, or volume traded information about the market-traded item.

85. The system of claim 73, wherein the user alert includes information about a most recent price of the market-traded item.

86. The system of claim 81, wherein the user alert includes information about a change of a price of the market-traded item or about a change of a volume traded of the market-traded item since a release of the news data, the change expressed as an amount of change or as a percentage of change.

87. The system of claim 81, wherein the user alert includes information about how much time has elapsed since a release of the news data.

88. The system of claim 81, wherein the user control module is configured to generate and to transmit information to the user based on additional news data received subsequent to the receiving of the news data based upon which the user alert was generated, the additional news data being most recent news data received for the market-traded item, the information indicating a time of a release of the additional news data.

89. The system of claim 88, wherein the user alert includes a time of a release of the news data based upon which the user alert was generated.

90. The system of claim 81, wherein the user alert includes information about an average volume traded since a release of the news data.

91. The system of claim 88, wherein the additional news data indicate the occurrence of the news event for the market-traded item.

92. The system of claim 81, wherein the user control module is configured to generate and to provide information to the user indicating a count of reports received indicating the occurrence of the news event for the market-traded item.

93. The system of claim 81, wherein the news data comprises a business news story, a business news article, a data compilation, a report, a company financial filing, a government report, or a press release involving the market symbol.

94. The system of claim 81, wherein the news category includes at least one category of news of the group consisting of stock upgrade news, stock downgrade news, corporate earnings news, securities dividends news, and initial public offering news.

95. The system of claim 81, wherein the news category includes at least one category of news of the group consisting of stock recommendation news, corporate takeover news, corporate merger news, corporate acquisition news, corporate securities filing news, and corporate bankruptcy news.

96. The system of claim 81, wherein the news category includes at least one category of news of the group consisting of labor action news, regulatory agency news, industry sector news, country or geographic region news, corporate product release news, corporate product line change news, corporate market share change news, and rumor regarding a corporation news.

97. The system of claim 81, wherein the news data is received from a third party vendor news source.

98. The system of claim 81, wherein the news data is received from a news consolidator.

99. The system of claim 81, wherein the user control module is configured to receive market data including data relating to a first market event, wherein the user control module is configured to generate the user alert and to transmit the user alert to the user only when the market data indicate that a price change of the market-traded item since a release of the news data exceeds a pre-specified threshold amount or a pre-specified threshold percentage.

100. The system of claim 81, wherein the user control module is configured to receive market data including data relating to a first market event, wherein the user control module is configured to generate the user alert and to transmit the user alert to the user interface only when the market data indicate that a volume traded change of the market-traded item since a release of the news data exceeds a pre-specified threshold amount or a pre-specified threshold percentage.

101. The system of claim 81, wherein the user control module is configured to receive market data including data relating to a first market event, wherein the user control module is configured to generate the user alert and to transmit the user alert to the user only when the market data indicate that an average volume traded change of the market-traded item since a release of the news data exceeds a pre-specified threshold amount or a pre-specified threshold percentage.

102. The system of claim 81, wherein the user control module is configured to receive the news data from a server storing text messages or e-mail communications, and the news data are included in the text messages or the e-mail communications.

103. The system of claim 81, wherein the news data comprise text messages or e-mail communications containing comments or recommendations by experts or professional commentators.

104. The system of claim 81, wherein the news data comprise text messages or e-mails from news vendors.

105. The system of claim 81, wherein the news data comprise a rumor about a company contained in a text message or an e-mail communication.

106. The medium of claim 10, wherein the user control module is configured to receive the news data from a server storing text messages or e-mail communications, and the news data are included in the text messages or the e-mail communications.

107. The medium of claim 10, wherein the news data comprise text messages or e-mail communications containing comments or recommendations by experts or professional commentators.

108. The medium of claim 10, wherein the news data comprise text messages or e-mails from news vendors.

109. The medium of claim 10, wherein the news data comprise a rumor about a company contained in a text message or an e-mail communication.

110. The medium of claim 16, wherein the user control module is configured to receive the news data from a server storing text messages or e-mail communications, and the news data are included in the text messages or the e-mail communications.

111. The medium of claim 16, wherein the news data comprise text messages or e-mail communications containing comments or recommendations by experts or professional commentators.

112. The medium of claim 16, wherein the news data comprise text messages or e-mails from news vendors.

113. The medium of claim 16, wherein the news data comprise a rumor about a company contained in a text message or an e-mail communication.

114. The medium of claim 30, wherein the user control module is configured to receive the news data from a server storing text messages or e-mail communications, and the news data are included in the text messages or the e-mail communications.

115. The medium of claim 30, wherein the news data comprise text messages or e-mail communications containing comments or recommendations by experts or professional commentators.

116. The medium of claim 30, wherein the news data comprise text messages or e-mails from news vendors.

117. The medium of claim 30, wherein the news data comprise a rumor about a company contained in a text message or an e-mail communication.

118. The method of claim 51, wherein the news data are received from a server storing text messages or e-mail communications, and the news data are included in the text messages or the e-mail communications.

119. The method of claim 51, wherein the news data comprise text messages or e-mail communications containing comments or recommendations by experts or professional commentators.

120. The medium of claim 51, wherein the news data comprise text messages or e-mails from news vendors.

121. The medium of claim 51, wherein the news data comprise a rumor about a company contained in a text message or an e-mail communication.

122. The system of claim 54, wherein the user control module is configured to receive the news data from a server storing text messages or e-mail communications, and the news data are included in the text messages or the e-mail communications.

123. The system of claim 54, wherein the news data comprise text messages or e-mail communications containing comments or recommendations by experts or professional commentators.

124. The system of claim 54, wherein the news data comprise text messages or e-mails from news vendors.

125. The system of claim 54, wherein the news data comprise a rumor about a company contained in a text message or an e-mail communication.

126. The system of claim 59, wherein the user control module is configured to receive the news data from a server storing text messages or e-mail communications, and the news data are included in the text messages or the e-mail communications.

127. The system of claim 59, wherein the news data comprise text messages or e-mail communications containing comments or recommendations by experts or professional commentators.

128. The system of claim 59, wherein the news data comprise text messages or e-mails from news vendors.

129. The system of claim 59, wherein the news data comprise a rumor about a company contained in a text message or an e-mail communication.

130. The system of claim 63, wherein the user control module is configured to receive the news data from a server storing text messages or e-mail communications, and the news data are included in the text messages or the e-mail communications.

131. The system of claim 63, wherein the news data comprise text messages or e-mail communications containing comments or recommendations by experts or professional commentators.

132. The system of claim 63, wherein the news data comprise text messages or e-mails from news vendors.

133. The system of claim 63, wherein the news data comprise a rumor about a company contained in a text message or an e-mail communication.

134. The system of claim 69, wherein the user control module is configured to receive the news data from a server storing text messages or e-mail communications, and the news data are included in the text messages or the e-mail communications.

135. The system of claim 69, wherein the news data comprise text messages or e-mail communications containing comments or recommendations by experts or professional commentators.

136. The system of claim 69, wherein the news data comprise text messages or e-mails from news vendors.

137. The system of claim 69, wherein the news data comprise a rumor about a company contained in a text message or an e-mail communication.

* * * * *